Nov. 3, 1936.  W. DE BACK  2,059,776
GRADING MACHINE
Filed Sept. 10, 1931   2 Sheets-Sheet 1
Fig. 1.
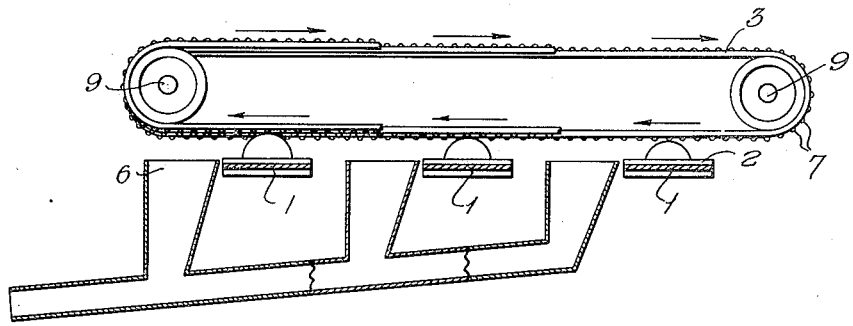
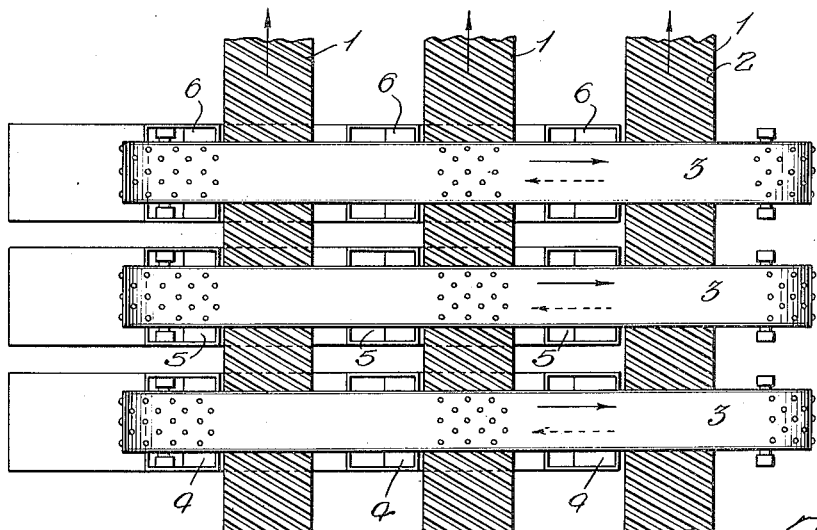
Fig. 2.
Fig. 3.
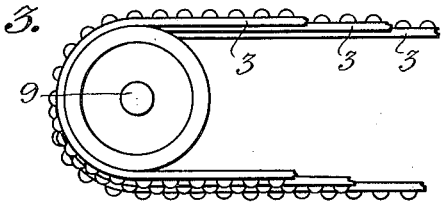
Inventor
William de Back
By
Attorney Nov. 3, 1936.  W. DE BACK  2,059,776
GRADING MACHINE
Filed Sept. 10, 1931  2 Sheets-Sheet 2

Inventor
William de Back
By
Graham
Attorney

Patented Nov. 3, 1936

2,059,776

UNITED STATES PATENT OFFICE 2,059,776

GRADING MACHINE

William de Back, San Jose, Calif., assignor to Food Machinery Corporation, San Jose, Calif., a corporation of Delaware Application September 10, 1931, Serial No. 562,177

9 Claims. (Cl. 209—91)

This invention relates to apparatus for grading and sorting articles and is particularly adapted to the grading and sorting of halved peaches in the preparation of this commodity for canning purposes.

In the handling of halves of fruits and particularly peaches it is desirable to have some device in the canning factory for sorting the halves, which are of promiscuous sizes into grades of substantially like sizes, so that the product when placed in the final receptacle will have the appearance of a superior product.

The efforts for automatically grading and sorting halves of fruits that have come to my attention have all been more or less unsatisfactory, and especially so with peach halves on account of the delicate nature of ripe fruit. All of the devices heretofore used have damaged the fruit more or less and have not on that account gone into general use.

In order to arrange the halves of peaches for grading it is necessary that the halves rest on their flat sides and when this has been done more or less suction has been created between the peach half and the surface on which it was resting that easy movement of the halves along the surface was so retarded by the suction that the exposed surface of the peach was injured in trying to move it for sorting.

The grading device disclosed by this application comprises briefly a series of conveyor belts or like devices moving in substantially a horizontal plane and directly over these belts but moving at substantially right angles thereto are a series of grading or selector belts each spaced just a little more from the conveyor belts so that the fruit halves, will according to their size be contacted with some one of the selector belts, which may have resilient devices along their contacting surface, and be thereby moved off the conveyor belt and dumped into a suitable sorting box.

Instead of conveyor and selector belts a modification can be used comprising a continuously rotating disk having a series of selector disks arranged around its periphery and with each spaced slightly farther above the conveyor disk and acting to select the peach or other fruit halves and slide them off the conveyor disk into a suitably positioned receptacle, this device might be provided with a feeder disk that would automatically place the fruit halves onto the conveyor disk, the fruit being placed by an operator, on the feeder disk in a promiscuous manner.

Other modifications may also be adopted but the showing of the two described will suffice to demonstrate the utility of the invention.

It is therefore a principal object of the invention to provide an article sorting device having spaced means for selecting articles of differing size.

It is also an object of the invention to provide grading and sorting means for half cylindrical articles that will position the articles with the flat faces all on the same plane.

It is also an object of the invention to provide grading and sorting means for half cylindrical articles that will position the articles with their flat faces all on the same plane and then sort the said articles through selecting means contacting with the upper surfaces thereof.

It is also an object of the invention to provide continuously moving means for supporting half cylindrical articles on their flat faces and sorting the articles into grades of like sizes by calipering the half diameter of the articles.

It is also an object of the invention to provide continuously moving means for supporting and conveying half cylindrical articles with their flat faces all on the same plane and to provide other moving means for calipering the articles to grade the same into groups of like sizes.

It is a further object of the invention to provide continuously moving means for supporting and conveying half cylindrical articles with their flat faces all positioned on the same plane and to convey the articles under other means for calipering the half diameter of the articles to sort the same into groups of substantially the same size.

It is also an object of the invention to provide a grading and sorting machine for half cylindrical articles wherein the articles are laid on their flat faces and passed underneath moving calipering means positioned for accepting articles of differing half diameters and placing them into suitably placed containers.

With such objects in view as well as other advantages which may be inherent in the invention, consisting in the parts and combinations hereinafter set forth and claimed, it is understood that the several necessary elements, parts and combinations constituting the same may be varied in their proportion, placement and general arrangement without departing from the scope and nature of the invention, and in order to make the invention more clearly understood there are shown somewhat diagrammatically, in the accompanying drawings means and mechanism for placing the same in concrete form, without limiting the improvements to the particular construction chosen to illustrate the invention.

Figure 1 is a side elevation partly in section illustrating one form and arrangement of the invention.

Figure 2 is a plan of Fig. 1.

Fig. 3 is a detail of one end of the selector mechanism.

Figure 4:
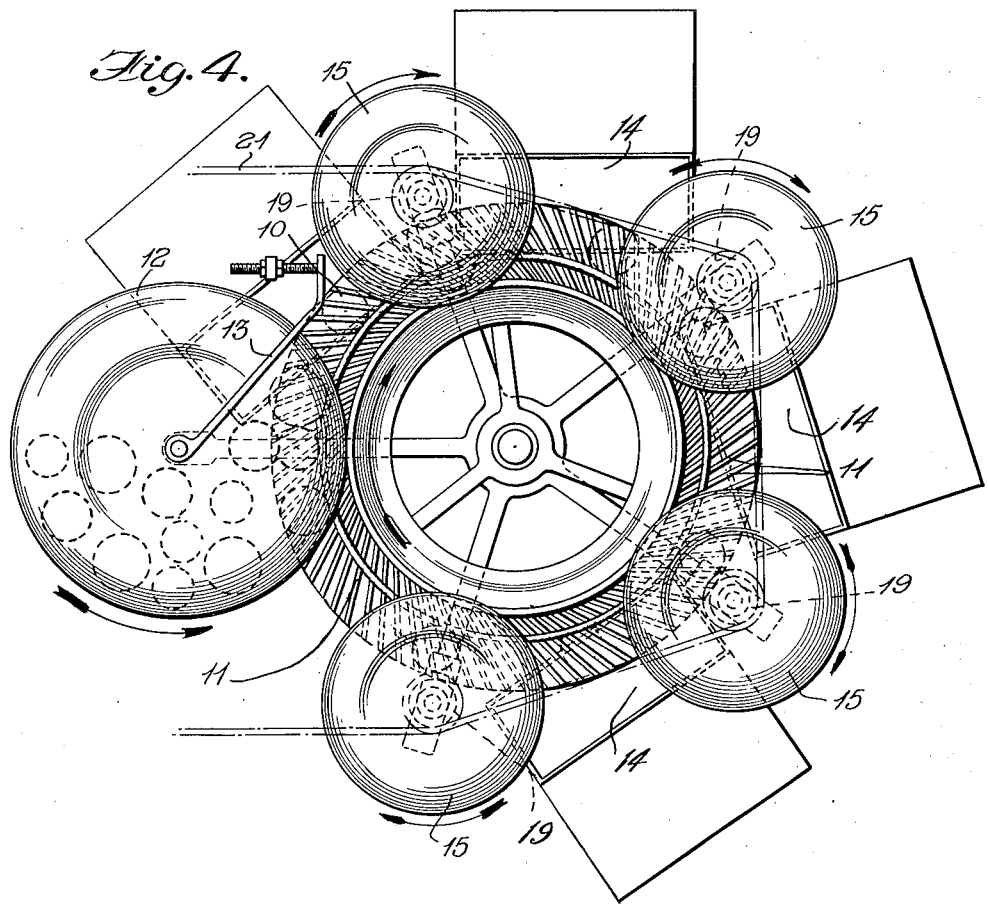
Fig. 4 is a plan of a modified construction but which operates on the same principle as the device in the previous figures.

In these drawings no attempt has been made to illustrate power devices or framework for the mechanism since it is all of such a simple and easily understood character that such showing was thought unnecessary, the showing is fully sufficient for those skilled in the art to construct apparatus embodying the invention and provide their own design of framework and power means.

Mention has been made that the device comprised a series of conveyor belts on which the fruit halves are placed and these are then moved under a series of selector belts moving at substantially right angles thereto and acting to caliper the half diameter of the presented fruit and when a fruit is properly contacted with one of the calipering belts that piece of fruit is gently moved off the conveyor belt and dropped into a suitably placed receptacle and chute runway which carries the graded fruits to any place for further disposal.

In the device of Figs. 1 to 3 the conveyor belts 1 moving in the direction of the arrows are provided on their upper surfaces with a series of suitably spaced cleats or grids for supporting the fruit halves without permitting a suction to develop between the flat face of the fruit and the belt so that the fruit will at all times move freely along the grids 2 whenever a fruit is calipered by one of the calipering belts 3. The calipering belts are differently spaced from the conveyor belts so that each calipering belt will select only one size of fruit half and when a fruit half is contacted with a calipering belt the combined movement of the two belts acts to move the fruit sideways and somewhat diagonally along the grids 2 and dump it into the receptacle placed for its reception.

The variable spacing of the calipering belts and the conveyor belts may be affected in various manners but I have here shown the conveyor belts as all moving on the same plane and the calipering belts each spaced just a little farther above the conveyor belts. Looking at Fig. 2 the belt 3 at the bottom of the view would be spaced the farthest from the conveyor belts so that only the larger fruit halves would be contacted and moved into the positioned receptacles 4. The middle belt would be spaced a little closer to the conveyor belts and the fruit selected by this belt would be discharged into the positioned receptacles 5, while the top belt would be adjusted the closest to the conveyor belts and would select only the smallest fruit halves and discharge them into the receptacles 6.

Each of the conveyor belts will of course carry fruit of varying sizes or half diameters and each of the selector or calipering belts will therefore select fruit from any one of the conveyor belts according to its half diameter.

Only three conveyor and three selector belts have been shown as an illustration of the invention. It is of course understood that as many or as few of either of the belts may be employed as is necessary to make the degree of grading desired.

The selector belts may be made in varying ways and of diverse materials. In the drawings there have been shown calipering belts having soft rubber or other, fingers or knobs 7, which may be short or long as may be desired to suit the particular product being handled.

When handling soft ripe peach halves for example it would be desirable to have these projections 7 of a quite soft and flexible material so that the fully ripe peach halves would not be injured or abraded in the least as they are calipered and shoved off the conveyor belts into the positioned receptacles or chutes 4, 5, or 6.

The variable spacing of the conveyor and selector belts may be accomplished by using different size pulleys over which the selector belts move or the separation may be accomplished by slightly canting the shafts 9 carrying the selector belts which would space the first selector belt of Fig. 1 just a little farther from the conveyor belts than the ones following in the rear as the view clearly indicates.

No feeding means are shown for placing the fruit halves on the conveyor belts, but this may be a simple feed disk or they may be placed thereon by operators who may pick the halves from a suitable supply and place them on the belts by hand.

In Fig. 4 is shown a modification of the invention as applied to disks and in this instance an automatic feed device is shown for placing the fruit halves on the conveyor disk.

In this modification of the invention a relatively large central disk is provided as a conveyor disk 10 on the top surface of which there are placed cleats or grids 11, preferably placed tangential to the radial line through the disk for supporting the fruit halves and lying somewhat in the direction of rotation so that as the fruit halves are moved therefrom they will tend to follow the line of the cleats.

At one side of the conveyor disk 10 is placed a feed disk of preferably thin metal overlying the disk 10 and adapted to receive and support a supply of fruit halves placed thereon in a promiscuous manner and carried thereby onto the conveyor disk, the feed disk 12 moving under a deflecting arm 13 which tends to sweep the fruit halves off the feed disk onto the conveyor disk. The sweep arm 13 is provided with an adjustment so that the fruit may be placed as desired on the conveyor disk.

Figure 5:
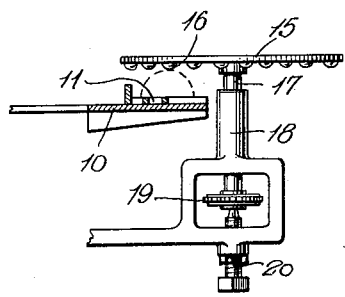
Fig. 5 is a detail of one of the selector disks.

Around the periphery of the conveyor disk may be arranged a series of selector or calipering disks each spaced a little farther above the conveyor disk so that fruit halves of differing half diameters will be selected and moved from the conveyor disk into the receptacles 14 placed adjacent the selector disks. Any well known adjustment means may be provided to adjust the selector disks relative to the conveyor disk and there has been shown one such means in Fig. 5 consisting of a simple screw adjustment acting on the lower end of the selector disk spindle. The selector disks 15 would have the same flexible or soft material projections 16 as has the selector belts 3 and the spindle 17 carrying the selector disk 15 would be mounted in a suitable bearing, driven by the sprocket 19 and adjusted as to height relative to the conveyor disk 10 by means of the screw 20, the selector disks 15 could all be moved by the same moving means as a chain 21. The feed disk and conveyor disk would be rotated by suitable means not shown. A suitable guide 22 may be placed concentric with the center of rotation of the conveyor disk, to guide the fruit halves through a somewhat restricted channel.

Other modifications and adaptations could be made to embody the invention and all such are intended to be included within the scope of the invention.

What I claim as new and desire to secure by Letters Patent is:

1. An apparatus for grading and sorting non-rollable fruit halves comprising a horizontal conveyor disk having a corrugated surface, a series of horizontal selector disks arranged around the periphery thereof and overlapping said conveyor disk, means for adjusting said selector disks relative to said conveyor disk so that each selector disk will select articles of differing half diameter from said conveyor disk and slide them in a radial direction therefrom and means for receiving each separated group.

2. An apparatus for grading and sorting non-rollable fruit halves comprising a horizontal conveyor disk for conveying fruit halves, spaced cleats on said disk for reducing frictional contact therewith, horizontal selector disks arranged around the periphery of and overlapping said conveyor disk and each spaced differently thereto and adapted to select fruit halves of differing diameters and slide them in a radial direction therefrom and means for receiving each separated group.

3. An apparatus for grading and sorting non-rollable fruit halves comprising means for moving fruit halves along a predetermined path in promiscuous arrangement, supporting corrugations on said means for reducing frictional contact therewith, selector means adjacent said moving means with elevations thereon, the elevations on said two means being the only contact with fruit halves in the grading thereof the elevations on said selector means being positioned at different spacings relative to the moving means whereby the selector means will slide fruit halves of like half diameters laterally from said supporting corrugations and means adjacent thereto for receiving said segregated fruit halves.

4. An apparatus for grading and sorting non-rollable fruit halves comprising a conveyor belt having a corrugated surface for supporting and moving a promiscuous lot of fruit halves along a path with their flat faces all positioned in the same plane on said corrugated surface, a grading belt moving over said promiscuously arranged fruit halves for selecting by calipering the different sizes, at substantially right angles to the flat face and assorting them into groups of substantially like sizes, with means adjacent said grading and sorting belts for receiving said assorted groups, said corrugations being disposed on the conveyor belt in a direction parallel to the line of composite motion of the conveyor belt and the grading belt.

5. An apparatus for grading and sorting non-rollable fruit halves comprising a plurality of corrugated belts having a corrugated surface for supporting and moving in a substantially horizontal plane, fruit halves with their flat faces all positioned on the same plane on said corrugated surface, a plurality of moving grading belts positioned over said fruit halves and each adapted to select a different half diameter fruit half and slide it from said carrying means along said corrugated surface, with means adjacent thereto to receive each of said selected sizes and assemble them into groups, said corrugations being disposed on the conveyor belt in a direction parallel to the line of composite motion of the conveyor belts and the grading belts.

6. An apparatus for grading and sorting non-rollable fruit halves by means of calipering, comprising a series of belts moving along parallel paths and all positioned in the same plane and each having a corrugated surface adapted to convey a promiscuous lot of fruit halves, with their rounded surfaces uppermost, selector belts positioned over said series of conveyor belts and moving at substantially right angles thereto and each positioned at a different height from said conveyor belts whereby each selector belt will select fruit halves of substantially like sizes and slide them laterally along said corrugated surfaces off said belts with means adjacent said belts for receiving said groups, said corrugations in said conveyor belts being disposed thereon in a direction parallel to the line of composite motion of said conveyor belts and said selector belts.

7. An apparatus for grading and sorting non-rollable fruit halves by a calipering process comprising a series of supporting and conveying belts for moving fruit halves with their flat faces all in the same plane on said corrugated surfaces, grading belts adjacent said conveying belts for engaging the exposed surfaces of the fruit halves and selecting those of like half diameters and sliding them laterally from said conveying belts, with means adjacent said conveying belts for receiving the selected groups, said corrugations being disposed on the conveyor belts in a direction parallel to the line of composite motion of the conveyor belts and the selector belts.

8. An apparatus for grading and sorting non-rollable fruit halves comprising a series of conveyor belts moving through a horizontal path and having corrugated surfaces to support and convey fruit halves with their flat faces all in the same plane on said corrugated surfaces, grading belts positioned over said conveying belts but variably spaced therefrom for engaging the fruit halves of different half diameters and sliding them laterally from said conveying means, with means for receiving said groups, said corrugations being disposed on said conveyor belts in a direction parallel to the line of composite motion of said conveyor belts and said grading belts.

9. An apparatus for grading and sorting non-rollable fruit halves comprising a series of conveyor belts having corrugated surfaces for supporting and conveying a lot of promiscuously arranged fruit halves having their rounded sides uppermost, grading belts positioned over said conveying belts but variably spaced therefrom for selecting fruit halves of substantially like sizes from said lot and sliding them laterally from said conveying belts with means for receiving said like sizes, the surfaces of said grading belts being provided with flexible devices, the said corrugations being disposed on said conveyor belts in a direction substantially parallel to the line of composite motion of said conveyor and grading belts.

WILLIAM DE BACK.